United States Patent [19]

Bloechle et al.

[11] Patent Number: 5,340,245
[45] Date of Patent: Aug. 23, 1994

[54] DEVICE ON PORTABLE MACHINE TOOLS

[75] Inventors: Hans Bloechle, Stuttgart; Karl Wanner, Leinfelden-Echterdingen, both of Fed. Rep. of Germany

[73] Assignee: Robert Bosch GmbH, Stuttgart, Fed. Rep. of Germany

[21] Appl. No.: 39,227

[22] PCT Filed: Oct. 8, 1991

[86] PCT No.: PCT/DE91/00787
§ 371 Date: Apr. 7, 1993
§ 102(e) Date: Apr. 7, 1993

[87] PCT Pub. No.: WO92/06823
PCT Pub. Date: Apr. 30, 1992

[30] Foreign Application Priority Data

Oct. 16, 1990 [DE] Fed. Rep. of Germany ....... 4032739
Oct. 16, 1990 [DE] Fed. Rep. of Germany ....... 4032796

[51] Int. Cl.$^5$ ...................... B23B 45/16; B23B 51/02
[52] U.S. Cl. ................................. 408/226; 279/119.3
[58] Field of Search ...................... 279/19, 19.3, 19.5; 408/226

[56] References Cited

U.S. PATENT DOCUMENTS 4,106,573 8/1978 Bailey .

FOREIGN PATENT DOCUMENTS 0147830 10/1985 European Pat. Off. .
3413005 10/1985 Fed. Rep. of Germany .
8600247 1/1986 Fed. Rep. of Germany .
3429419 2/1986 Fed. Rep. of Germany .
3501690 7/1986 Fed. Rep. of Germany .
2331410 6/1977 France .
2349413 11/1977 France .
2158376 11/1985 United Kingdom .
8809245 1/1988 World Int. Prop. O. .

Primary Examiner—Steven C. Bishop
Attorney, Agent, or Firm—Michael J. Striker

[57] ABSTRACT

A device for transmitting a rotary and/or percussive movement to a tool is formed in such a way that the associated tools having three grooves arranged in rotationally symmetrical fashion can likewise be clamped in drill chucks having three chuck jaws. In addition, the tool is to have the limited axial mobility required when hammer drilling or chiselling. For this purpose, the device is equipped with three rotary driving elements arranged in a location hole and projecting inwards. The rotary driving elements are arranged in rotationally symmetrical fashion, are of equal width and have flanks which extend approximately parallel to one another. One of the rotary driving elements is longer in the radial direction than the other two in order to guarantee positionally correct insertion of the tool and satisfactory locking of a locking body in a closed groove of the tool. The rotary driving elements are fixed immovably in the location hole. A blocking element is arranged at least at one side wall of the open groove and narrows its otherwise free cross-section.

17 Claims, 3 Drawing Sheets

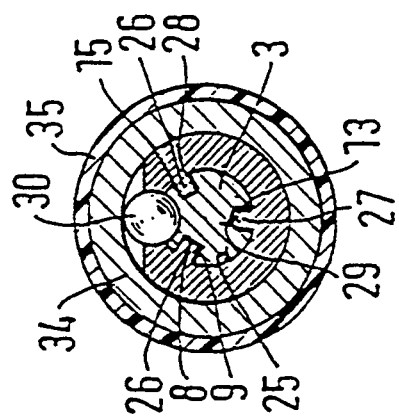
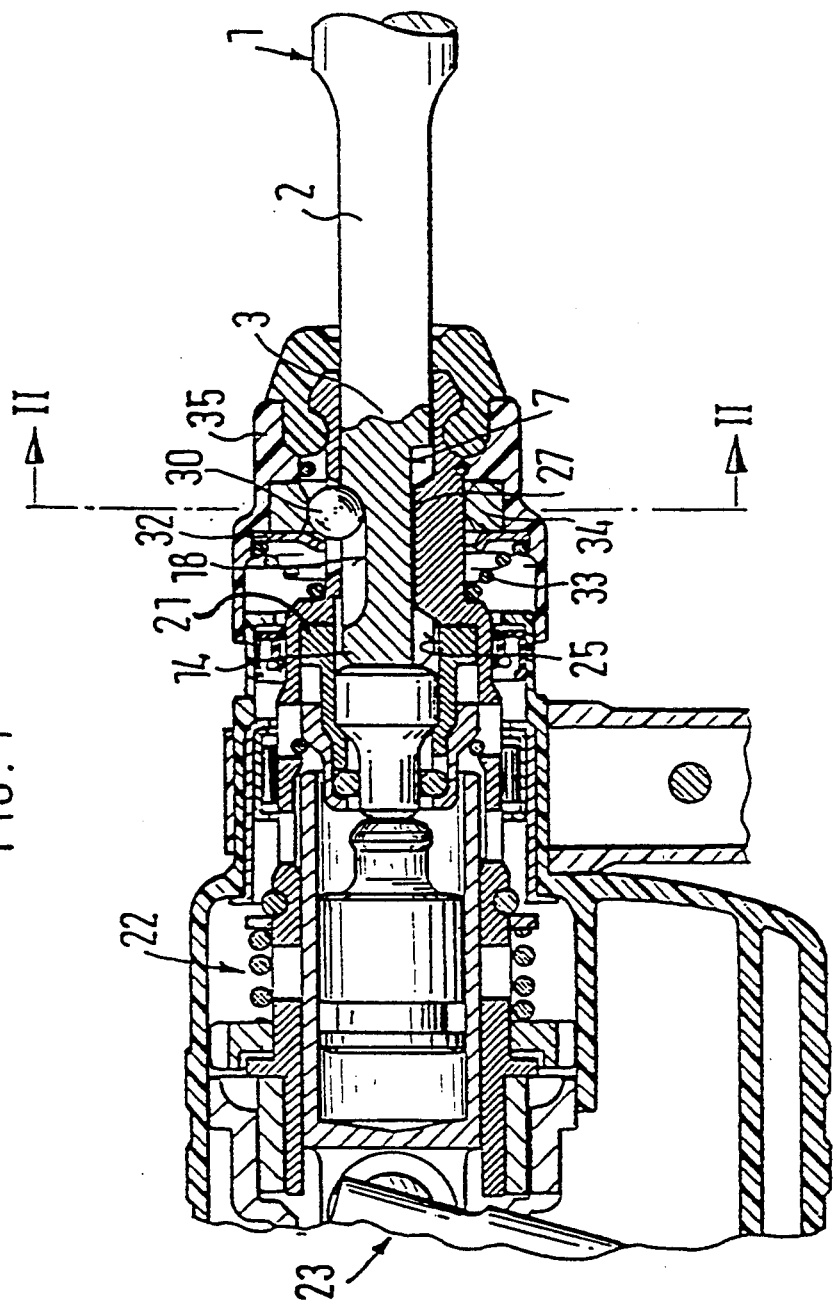

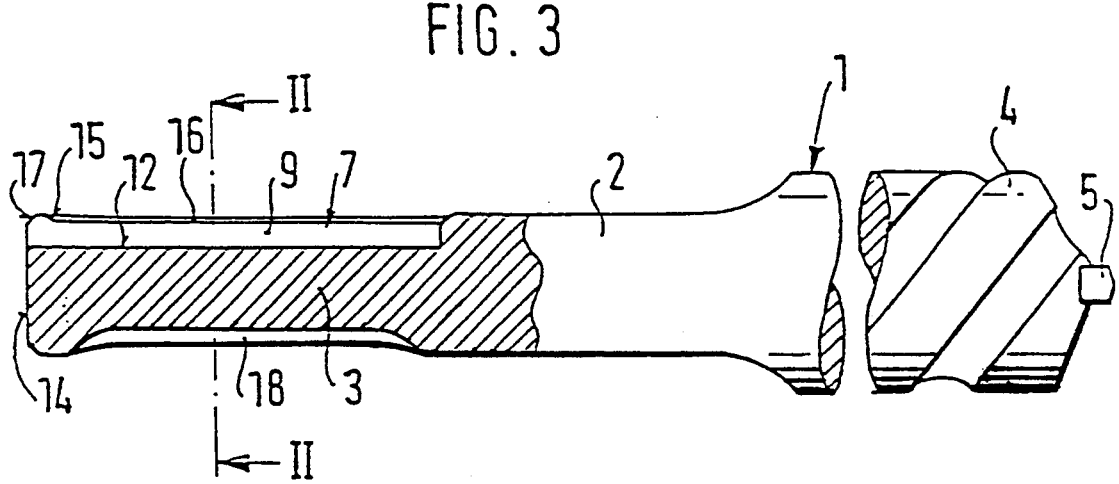
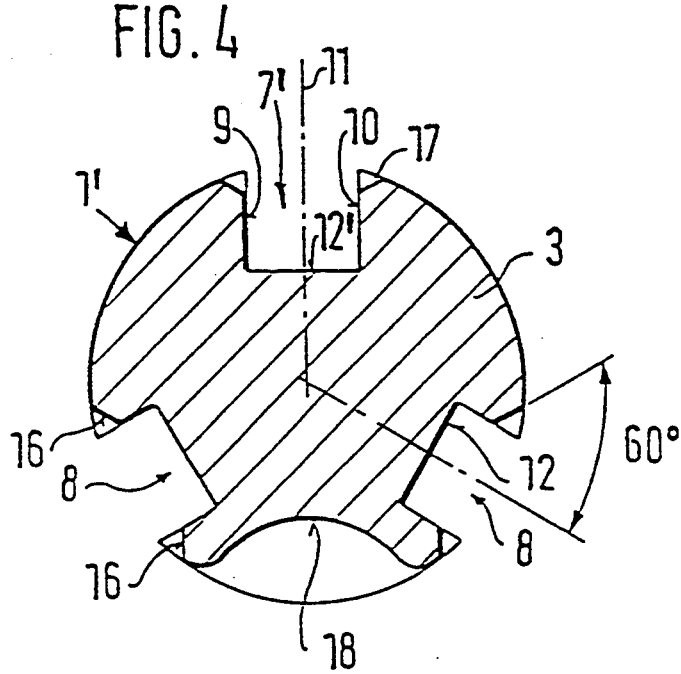
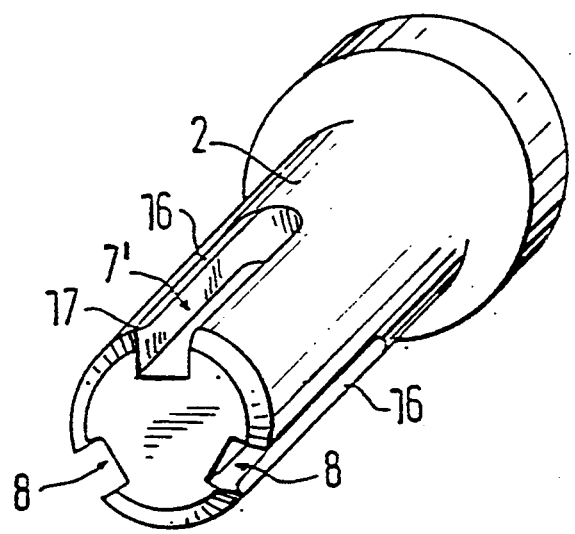

DEVICE ON PORTABLE MACHINE TOOLS

BACKGROUND OF THE INVENTION

The present invention relates to a device on portable machine tools.

More particularly, it relates to a device on portable machine tools, in particular portable drilling or percussive appliances, which is suitable for transmitting a rotary and/or a percussive movement to a tool having rotary driving grooves open toward an end of the shank and a location hole with inwardly projecting rotary driving elements engaging in the grooves of the tools.

Devices of the above-mentioned general type are known in the art. One such device is that disclosed for example in WO DE88/00260. However, it is only possible to insert into these tools with open grooves distributed non-uniformly over the circumference. The rotary driving elements of the known device are arranged asymmetrically and thus prevent universal use. In particular, the tools suitable for this device are not compatible with other tool holders such as drill chucks. On the one hand, there is the risk that some of the chuck jaws will engage in the existing grooves, leading to eccentric gripping, and, on the other hand, there is no axial mobility of the tool in drill chucks. However, a limited axial mobility is very advantageous in the case of impact drilling tools since then, when striking, only the tool itself and not, in addition, parts of the chuck have to be moved.

Tools are inserted into the device. Another tool is known from DE-A-34 29 419. This tool can be gripped in drill chucks with three jaws and inserted into tool holders of certain hammer drills. The tools have a closed groove for locking in the hammer drills. In percussive operation, this groove for the rotary driving and locking elements is subjected to severe loading. Since it is only partially closed, there is the risk, in the case of worn-out shanks, that the tool will be released unintentionally. Furthermore, the known tools are not suitable for hammer drills with tool holders which have inwardly facing rotary driving strips.

It is disadvantageous for use in machines with drill chucks that the design of the grooves in the shank of these tools permits only fixed gripping without axial mobility of the tool. However, a limited axial mobility is very advantageous in the case of impact drilling tools since then, when striking, only the tool itself and not, in addition, parts of the chuck have to be moved. There is thus no axial securing of the tool when it is used in drill chucks. The known shank design is thus not suitable for universal application and as a standard shank shape for various types of portable drilling or percussive appliances and all applications.

SUMMARY OF THE INVENTION

Accordingly, it is an object of the present invention to provide a device for portable machine tools, which avoids the disadvantages of the prior art.

In keeping with these objects and with others which will become apparent hereinafter, one feature of the present invention resides, briefly stated, in a device of portable machine tools, in particular portable drilling or percussive appliances, suitable for transmitting a rotary and/or a percussive movement to a tool having three rotary driving grooves open toward the end of the shank and a location hole with inwardly projecting rotary driving elements with essentially flat flanks, which rotary driving elements engage in the open grooves of the tool, wherein in accordance with the present invention, the rotary driving elements are arranged in a rotationally symmetrical fashion, are of equal width and have flanks which extend approximately parallel to one another.

When the device is designed in accordance with these features, it has the advantage that it can be used to transmit high torques to specially designed tools with three open grooves distributed uniformly over the circumference in a manner which reduces stress on the shank. At the same time, there is a limited axial mobility of the tool for impact drilling or chiselling. The device according to the invention is thus suitable for optional use of tools suitable for drill chucks in tool holders of hammer drills and impact drilling machines for all applications.

The device makes possible the use of just one single shank shape for all types of tool head and all types of drilling or percussive portable machine tools without penalties in the rotary driving, exact truth of running or axial mobility.

In accordance with another feature of the invention, a radially longer design of one of the rotary driving elements reliably prevents insertion of the tool in an incorrect rotational position, something which can lead to faulty locking. Rounding of the longer rotary driving element makes possible a corresponding rounding of the deeper groove of the tool, benefiting the strength of the shank.

Likewise for reasons of strength, the longer rotary driving element is advantageously arranged opposite the locking element. The diameter of the location hole, at preferably 12 to 13 mm, is chosen so that as large as possible a load-bearing shank cross-section is provided. The tools equipped therewith are, on the other hand, still easy to handle and light and likewise fit into drill chucks with an opening width of 13 mm.

In accordance with another feature of the invention, the tool has at least one groove closed toward the end of the shank, and the open grooves have side walls extending approximately parallel to one another, and at least one side wall has at the end of the shank a blocking element which restricts the free cross-section of the associated groove. Such a tool has the advantage that the design of its shank is suitable for all applications, such as pure drilling, impact drilling or chiselling and is equally suitable for drill chucks and for tool holders having rotary driving elements. This makes it possible to use just one shank shape for all types of tool head and portable machine tools without losses of transmissible torque or axial mobility. In the case of drilling tools in three-jaw chucks, the provision of a chamfer on each of the groove edges of the open grooves brings about positive engagement of the chuck jaws in the shank with increased security against slipping. The equal width of all the grooves or equal spacing of the chamfers also ensures satisfactory centring of the tool in jaw chucks. In the case of stricken tools, at least one groove side wall extended at the end of the shank offers a positively engaging latch which reliably prevents the tool from falling out with the chuck jaws only loosely tightened. Not least, the characteristic shape of the shank prevents confusion with customary commercially available tools. Otherwise, this could give rise to a risk of injury in the event of inadequate locking.

It is particularly advantageous in reruns of manufacture to form the lock at the end of the shank, the said lock being formed by the extended side wall, by providing on the remaining groove edge a chamfer running out towards the end. The angular position of the bearing surfaces corresponds exactly to the angle of 120° of the flanks of the chuck jaws, with the result that they rest against the entire bearing surface. The arrangement of a groove closed on all sides on a rib remaining between the open grooves leads to an unweakened groove edge for locking the tool. This eliminates possible wear of the closed groove at its ends. A rectangular cross-section of the open grooves has the advantage of economical manufacture by simple milling. Making one of the open grooves deeper makes positionally correct introduction easier in the case of hammer-drill tool sockets likewise having a longer rotary driving element and prevents any possible faulty locking. For reasons of strength, the deeper groove is advantageously arranged opposite the closed groove and is rounded. It is thereby possible to transmit high torques without significant weakening of the shank. The shank diameter, at preferably 12 to 13 mm, is chosen so that the tool shanks can be gripped without problems in drill chucks with an opening width of 13 mm and that as large as possible a load-bearing shank cross-section is nevertheless provided. The chosen cross-section is adequate for tools with a drilling-head diameter of up to about 30 mm.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a device according to the invention in longitudinal section and FIG. 2 shows a cross-section along the line II—II in FIG. 1. FIG. 3 shows a tool in longitudinal section. A second illustrative embodiment is shown in cross-section in FIG. 4 and in perspective view in FIG. 5.

DESCRIPTION OF THE PREFERRED EMBODIMENTS

Figure 7:
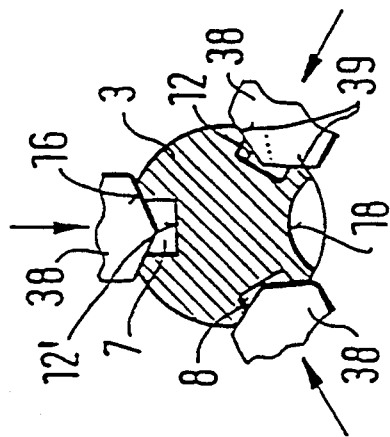
FIG. 6 shows a tool inserted into a drill chuck and FIG. 7 shows a section according to VII—VII in FIG. 6.

A tool 1 for drilling, chiselling, filing or the like has a shank 2 which bears an insertion end 3 at one end. At the other end, it is equipped with any desired tool head 4. In the first illustrative embodiment, this is a drill with a carbide insert 5 (see FIG. 3). The insertion end 3 has an essentially circular cross-section with a diameter of about 11 to 13 mm, preferably 12 mm. This is interrupted by three grooves 7, 8 of equal width extending in the axial direction of the shank 2 (see FIG. 2). These have mutually parallel flat side walls 9, 10 which are aligned parallel to a centre plane 11 radial to the shank and extending in the longitudinal direction of the respective groove 7, 8, in the centre of the latter. The grooves 8 have a flat groove base 12 aligned perpendicularly to the side walls 9, 10, resulting in the first instance in a rectangular groove cross-section. The groove 7 has a rounded groove base 13. The grooves 7, 8 are open towards the end 14 of the shank, allowing rotary driving elements of a tool holder to be pushed into the grooves from the end 14 of the shank. The three grooves 7, 8 are arranged distributed in rotationally symmetrical fashion at an angular spacing of 120° over the circumference of the insertion end 3.

Groove edges 15 bound the side walls 9, 10 towards the outside. The groove edges 15 are provided over the major part of the groove length with chafers, which form narrow bearing surfaces 16 at an angle of 60° to the centre plane 11 of the groove (see FIG. 3). The bearing surfaces 16 run out towards the end 14 of the shank, leaving the unweakened groove edges 15 or the radially extended side walls 9, 10 as locking elements 17 in this region. An axial length of 1 to 2 mm is sufficient for the locking elements 17. Groove 7 is cut deeper than the other two grooves 8. The flat grooves 8 are about 2 to 2.5 mm deep. The width of the grooves is preferably 3 to 4 min. The deeper groove 7 is about 3 to 3.5 mm deep.

Arranged diametrically opposite the deeper groove 7 is a groove 18 closed towards the end 14 of the shank. It is situated on the rib 19 between the two flatter grooves 8 but does not impinge on these grooves. Like the other grooves 7 and 8, groove 18 is closed towards the tool head 4. It serves for the engagement of a ball- or roller-shaped locking body, described below.

The tool 1 is inserted into a device for transmitting a rotary- and/or percussive movement to the tool. The device includes a tool holder 21 adjoining a striking mechanism 22 of a hammer drill 23. In the centre, the tool holder 21 has a location hole 25. Three rotary driving elements 26, 27 extending in the axial direction of the location hole 25 reach into the location hole 25. The rotary driving elements are arranged in rotationally symmetrical fashion at an angular spacing of 120° relative to one another. Rotary driving element 27 is of radially longer design than the two other, shorter rotary driving elements 26. The rotary driving elements 26, 27 have flat flanks 28 which extend parallel to one another. With their flanks 28, the rotary driving elements 26, 27 rest against the side walls 9, 10 or, in operation, at least against the respective side wall 9 at the front in the direction of rotation. The grooves 7, 8 are thus filled by the rotary driving elements. All the rotary driving elements are of the same width. However, one of the rotary driving elements 27 is of radially longer design than the two other rotary driving elements 26. The longer rotary driving element 27 can have a rectangular cross-section, like the others. It is particularly advantageous, however, if its extra length has a rounded front edge 29. Opposite the longer rotary driving element 27 there is a locking body 30 which engages in the closed groove 18 in the tool 1. The length of the closed groove 18 or the small axial extent of the locking body 30 ensure a limited axial mobility of the tool 1 in the tool holder 21. The rotary driving element 27 engaging in the deeper groove 7 prevents the insertion of the tool 1 into the tool holder 21 in an incorrect rotational position and ensures that the locking body 30 engages in the closed groove 18 in all cases.

The locking body 30 is pushed into its locking position (shown in the figures) by an axially displaceable retention plate 32. The retention plate 32 is for this purpose loaded by a compression spring 33. In its locked position, the locking body 30 rests radially against a retention ring 34. This retention ring 34 can be displaced axially towards the hammer drill 23 by a sliding sleeve 35, allowing the locking body 30 to yield radially.

The device according to the invention is put into operation by inserting the tool 1 into the location hole 25 of the tool holder 21 and turning until the rotary driving element 27 can be introduced into the deepened groove 7. By axial pressure on the tool 1, the locking body 30 is pushed axially inwards and radially outwards against the retention plate 32, allowing the tool to be pushed into the location hole 25 completely. The locking body 30 is then pushed radially inwards by the spring-loaded retention ring and engages in the closed groove 18. During the operation of the hammer drill, the tool holder 21 is driven in rotation and the rotary driving elements 26, 27 thus transmit a torque to the tool 1 via their—in the direction of rotation—forward flanks 28. The symmetrical introduction of force from three sides into the shank 2 allows the transmission of particularly high torques in a gentle manner. At the same time, the rotationally symmetrical engagement gives rise to a centring action on the tool 1, which is not the case with just two rotary driving elements.

To release the tool, the sliding sleeve 35 is pulled back away from the tool 1. The ball 30 can now yield radially and move out of the closed groove 18 to allow the tool to be removed from the tool holder 21. The tool 1 can be used not only in the device according to the invention but also in commercially available drill chucks with three rotationally symmetrical jaws. These then engage partially in the open grooves 7, 8 of the tool 1.

FIGS. 4 and 5 show a second illustrative embodiment of the tool according to the invention. The tool 1' differs from the first illustrative embodiment only by the fact that the groove base 12' of the deeper groove 7' is not rounded.

Figure 6:
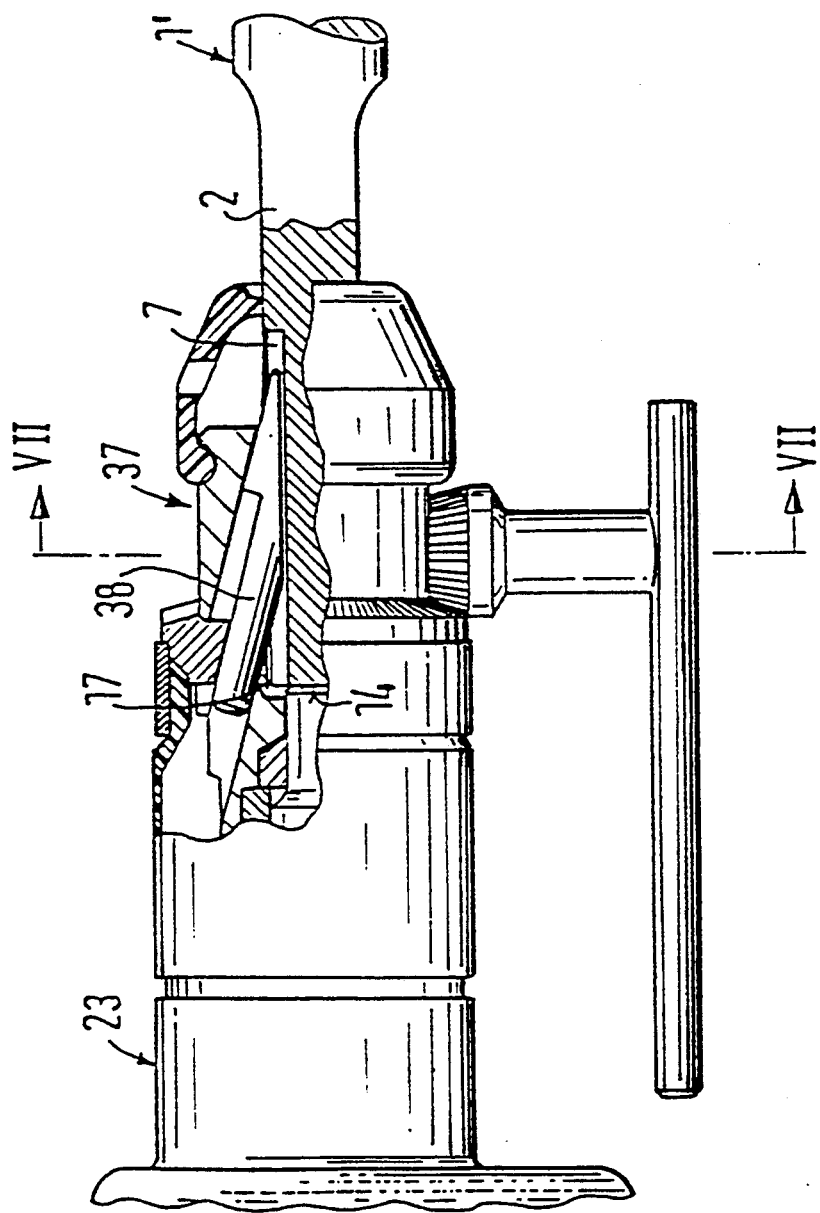

In FIGS. 6 and 7, a tool 1' of the second illustrative embodiment has been inserted into a tool holder of a drill or hammer drill 23, the tool holder being designed as a three-jaw chuck 37. The jaw chuck 37 has three chuck jaws 38, each of which has inwardly directed flanks 39 tapering at 120° towards one another. The chuck jaws 38 engage in the grooves 7, 8 and rest against the bearing surfaces 16. According to FIG. 6, the tool 1' has been inserted into the drill chuck 21 to such an extent that the end 14 of the shank and the blocking elements 17 come to be outside the range of engagement of the chuck jaws 38. This ensures with certainty that, even when the chuck jaws 38 have not been tightened firmly, the tool 2 cannot slip out of the drill chuck and, on the other hand, ensures a limited axial mobility of the tool. The blocking elements 17 here act as a stop for the chuck jaws 38.

The groove depth is also sufficient to ensure that although the flanks 39, each tapering at 120° towards one another, of the chuck jaws 38 touch the bearing surfaces 16, they do not touch the groove base 12 or 12'.

The invention is not limited to the particular configuration in the illustrative embodiments. Thus, it is equally as true that the tool with the rounded groove base 12 can be inserted into drill chucks as that, conversely, a flat groove base is suitable for tool holders of hammer drills. The blocking elements 17 are generally designed as radially extended side walls 9, 10; it is also possible, in the case of unchamfered groove edges, for them to be designed as a projection which projects beyond the shank diameter or engages laterally on one side into the groove and which reaches into the projected area of the chuck jaws.

We claim:

1. A portable machine tool for drilling or percussive appliances, comprising a tool performing at least one of a rotary movement and a percussive movement and having a shank and three rotary driving grooves which are open toward an end of said shank; means forming a location hole with inwardly projecting rotary driving elements having substantially flat flanks and engaging in said grooves of said tool, said rotary driving elements being arranged in a rotationally symmetrical fashion, having equal width and being provided with flanks which extend substantially parallel to one another, said rotary driving elements being fixed immovably in said location hole.

2. A portable machine tool as defined in claim 1; and further comprising a locking element arranged opposite one of said rotary driving elements.

3. A portable machine tool as defined in claim 1, wherein said location hole has an inside diameter of substantially between 11 mm and 13 mm.

4. A portable machine tool for drilling or percussive appliances, comprising a tool performing at least one of a rotary movement and a percussive movement and having a shank and three rotary driving grooves which are open toward an end of said shank; means forming a location hole with inwardly projecting rotary driving elements having substantially flat flanks and engaging in said grooves of said tool, said rotary driving elements being arranged in a rotationally symmetrical fashion, having equal width and being provided with flanks which extend substantially parallel to one another, said rotary driving element being fixed immovably in said location hole and one of said rotary driving elements being longer in a radial direction than the other two of said rotary driving elements.

5. A portable machine tool as defined in claim 4, wherein said one rotary driving element which is longer has an end and is rounded at said end.

6. A portable machine tool as defined in claim 4; and further comprising a locking element which is arranged opposite to said one rotary driving element which is longer.

7. A tool for use in drill chucks or in tool sockets of portable drilling or percussive appliances, the tool having a shank; a tool head and an insertion end, said shank having three grooves provided on its circumference at equal angular spacing from one another and having equal width, said grooves being open toward said end of said shank and having side walls extending substantially parallel to one another, said shank having at least one additional groove which is closed toward said end of the shank, at least one side wall of at least one of said first-mentioned grooves having at said end of said shank a blocking element which narrows an otherwise free cross-section of said at least one first-mentioned groove.

8. A tool as defined in claim 7, wherein said first-mentioned open grooves form a rib therebetween, said additional closed groove is arranged on said rib.

9. A tool as defined in claim 7, wherein said additional closed groove is closed on all sides and is not connected with said first-mentioned open grooves.

10. A tool as defined in claim 7, wherein said first-mentioned open grooves have a substantially rectangular cross-section.

11. A tool as defined in claim 7, wherein said shank has a diameter substantially between 10 and 14 mm.

12. A tool as defined in claim 11, wherein said shank has a diameter substantially between 12 and 13 mm.

13. A tool as defined in claim 7, wherein said first-mentioned open grooves have a width of substantially between 2 and 4 mm and a depth of substantially 2 mm.

14. A tool for use in drill chucks or in tool sockets of portable drilling or percussive appliances, the tool having a shank; a tool head and an insertion end, said shank having three grooves provided on its circumference at equal angular spacing from one another and having equal width, said grooves being open toward said end of said shank and having side walls extending substantially parallel to one another, said shank having at least one additional groove which is closed toward said end of said shank, at least one side wall of at least one of said first-mentioned grooves having at said end of said shank a blocking element which narrows an otherwise free cross-section of said at least one first-mentioned groove and said first-mentioned open grooves having rims provided with bearing surfaces in the form of a chamfer which extends at about 60° to a center plane of a corresponding one of said first-mentioned open grooves and of which at least one ends before said end of said shank so as to allow chuck jaws to bear against said rims.

15. A tool for use in drill chucks or in tool sockets of portable drilling or percussive appliances, the tool having a shank; a tool head and an insertion end, said shank having three grooves provided on its circumference at equal angular spacing from one another and having equal width, said grooves being open toward said end of said shank and having said walls extending substantially parallel to one another, said shank having at least one additional groove which is closed toward said end of said shank, at least one side wall of at least one of said first-mentioned grooves having at said end of said shank a blocking element which narrows an otherwise free cross-section of said at least one first-mentioned groove and one of said first-mentioned open grooves being deeper than the other two of said first-mentioned open grooves.

16. A tool as defined in claim 15 wherein said one first-mentioned deeper open groove has a base which is rounded.

17. A tool as defined in claim 15, wherein said additional closed groove is arranged opposite to said one first-mentioned deeper open groove.

* * * * *